UNITED STATES PATENT OFFICE.

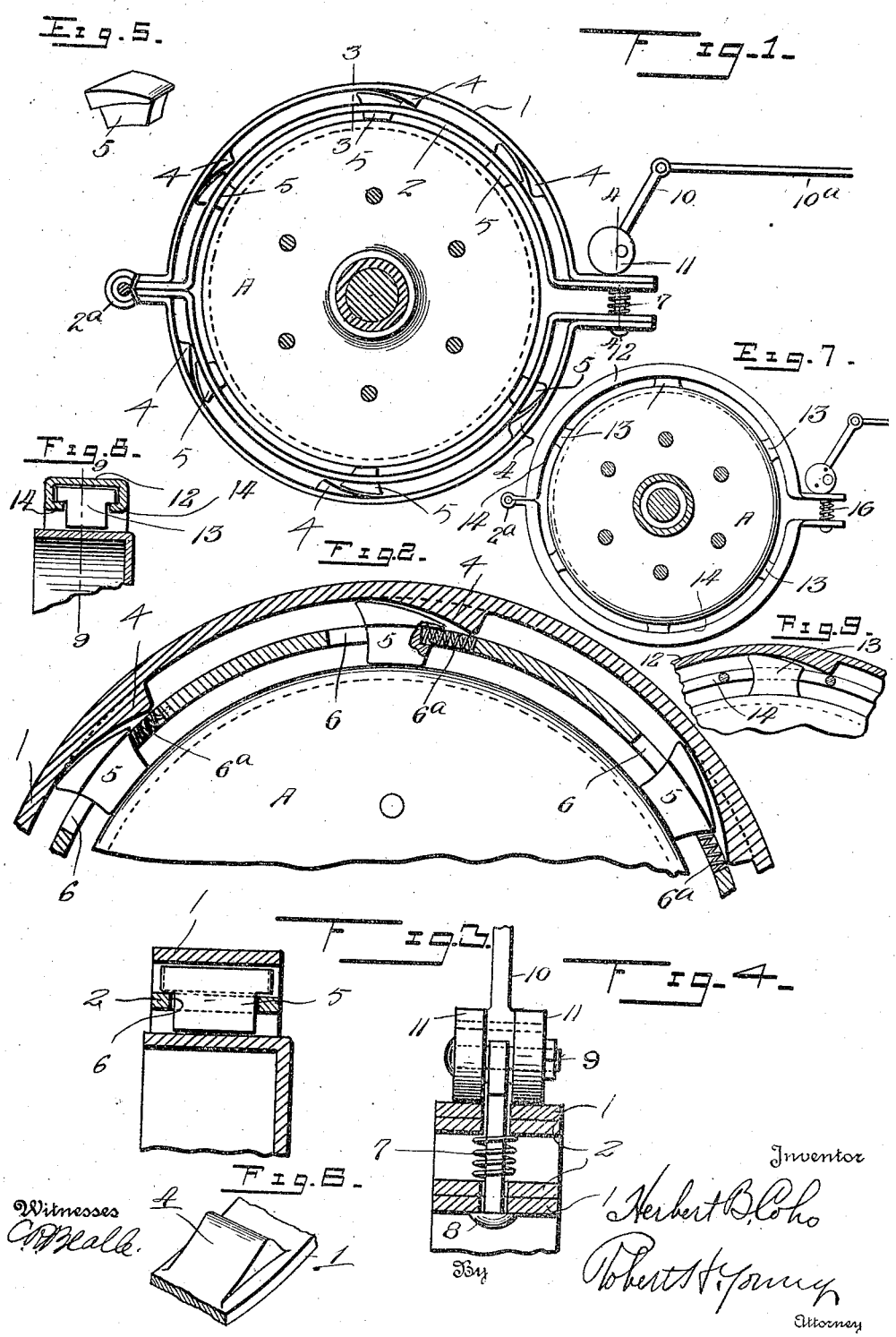

HERBERT B. COHO, OF MOUNT VERNON, NEW YORK.

BRAKE-BAND.

1,306,404. Specification of Letters Patent. Patented June 10, 1919.

Application filed June 29, 1917. Serial No. 177,740.

*To all whom it may concern:*

Be it known that I, HERBERT B. COHO, a citizen of the United States, residing at Mount Vernon, in the county of Westchester and State of New York, have invented certain new and useful Improvements in Brake-Bands, of which the following is a specification.

The object of my invention is to produce a frictional brake band having a normal tendency to spread or expand and separate itself from the drum or moving part to which it is applied, and thus avoid dragging or undesired retention by the moving parts and consequent wear upon the frictional surfaces. A further object thereof is to provide a band of the character described in which the bearing face comprises a plurality of blocks made of metal, wood, fiber or other suitable material, loosely carried thereon and spaced apart by resilient means on the band; another object of my invention is to produce a brake band comprising outer and inner members adapted to be drawn together when clamped upon the drum to which they are applied; a further object thereof is to produce a double brake band, upon one of which is loosely carried a plurality of inserted blocks, and upon the outer member of which is rigidly carried a plurality of beveled bosses adapted to be normally out of contact with said inserted blocks, but adapted, when the brakes are applied, to gradually clamp upon said blocks and bind them frictionally upon the drum to which the brake is applied. A further object of my invention is to produce means, connected with said brake bands for automatically applying same to the brake drums when the movement thereof is reversed and the speed exceeds a predetermined rate; and, a further object of my invention is to produce a more simple, cheap and efficient device of the character described than has heretofore been attained.

To these ends, my invention includes the combination and arrangement of component parts to be hereinafter described and more particularly pointed out in the claims.

In the accompanying drawings in which like reference characters indicate similar parts, Figure 1 is a side elevation of a brake band embodying my invention in partial cross section;

Fig. 2 is a sectional view of the same;

Fig. 3 is a cross sectional view on the line 3—3 of Fig. 1.

Fig. 4 is a cross sectional view on the line 4—4 of Fig. 1,

Fig. 5 is a detail perspective view of one of the brake blocks.

Fig. 6 is a detail perspective view of a part of the outer band and one of the wedge-shaped bosses thereon, Fig. 7 is view in elevation of a modified form of structure, Fig. 8 is a cross sectional view of the same, Fig. 9 is a sectional view on the line 9—9 of Fig. 8.

Referring now to the drawings, 1 indicates an outer metallic band, and 2 designates an inner band, which, as shown, are preferably semi-annular, and are jointed at 2ª to facilitate their operation.

The outer band 1 is provided at spaced positions with a plurality of beveled bosses 4 constituting wedges adapted to bear upon the tops of the inserted blocks 5 loosely carried in the inner band 2 when the brakes are applied and gradually impose frictional contact on the rotating part A.

The inner band 2 is provided with a plurality of longitudinal slots 6 in which the tapered blocks 5 are loosely carried, and said slots permit a limited longitudinal movement of the blocks to prevent the sudden locking of the wheels to which they are applied. It will be apparent that the tendency of the blocks during the forward movement of the wheels would be to ride forward and thus impose a limited restriction, but as the outer bands 1 bear upon the tops thereof, and the beveled faces of the bosses 4 ride upon the tops of the blocks, they would be more rigidly clamped, but the blocks of such construction could not be immediately locked and thus cause skidding of the wheels to which they are applied.

The blocks 5 thus described may be made of metal, wood, fiber, paper or other suitable material, and are capable of replacement when the faces become worn and exhausted.

As shown in Fig. 2 each of the blocks 5 is preferably yieldingly held away from one end of its slot 6 by a yielding member, in the present embodiment illustrated as a coiled spring 6ª, which has a tendency to straighten the band and thus lift it and the brake blocks out of contact with the brake surface to which it has been applied, and prevent the hindrance and wear on the bearing part that occur by "dragging" or a delayed reaction upon the release. It will be appreciated that any suitable means may be substituted for the coiled springs.

The bands thus described are further held out of contact with the moving parts by the resiliency of the metal of which they are made, and preferably there is interposed between their free ends a coiled spring 7 which likewise serves to separate the opposite portions of said spring and release the blocks 5 from frictional engagement with the moving part A. Any suitable means may be employed for bringing the free ends of the bands together for the purpose of securing the braking action. Thus in the present embodiment the said means, as shown more particularly in Fig. 4, is a bolt 8 loosely passing therethrough and through the spring 7. This bolt has an eccentric connection 9 with an operating arm 10 having a rolling engagement 11 on one end of the outer band. A link 10ª connected to the free end of the arm 10 leads to any suitable actuating member.

In the modified form of my invention shown in Fig. 7 of the drawings, a brake band formed of one member 12 is illustrated in which the brake blocks 13 are movably carried in the crimped flanges 14 formed on the inner edges of the band in which said brake blocks are longitudinally slidable in spaced relation, as described hereinbefore.

As is also shown in the modified form of the brake setting means disclosed in Fig. 7 of the drawings, the brake bands are normally held out of engagement by a coiled spring 16, and may be applied by any suitable means.

It will be appreciated that the brake of my invention is peculiarly effective when a car stops on an up-grade, and there is a tendency of the car to run backward. The effect of this reverse movement is to ride the brake blocks 5 upon the beveled faces of the bosses 4, and thus more securely lock the parts in immovable position.

Having thus described my invention, what I claim as new and desire to be secured by Letters Patent is:

1. A brake band formed of an inner and an outer member, frictional blocks carried on the inner member and bosses carried on the outer member for bearing upon said blocks when the bands are applied.

2. A brake band formed of an inner and outer annular member, frictional blocks loosely carried on the inner member, and beveled bosses carried on the outer member for bearing upon said frictional blocks when said annular members are tensioned.

3. A brake band comprising an outer annular member, beveled bosses carried thereon, an inner annular member having a plurality of longitudinal slots therein, and a friction block loosely carried in each of said slots, adapted to be engaged on their outer faces by the beveled faces of said bosses when the brake band is contracted.

4. A brake band comprising an outer annular member and a plurality of beveled bosses carried thereby, an inner annular member having a plurality of longitudinal slots therein, friction blocks located in each of said slots and engaged by the beveled bosses, and means for contracting the outer annular member.

5. A brake member comprising an annular member, friction blocks carried thereon and capable of longitudinal movement with respect to said annular member, resilient members operating against said blocks to yieldingly resist such longitudinal movement, and means for contracting the annular member.

6. A brake band formed of an annular member, frictional blocks movably carried thereon in spaced relation, and beveled bosses carried on said annular member in contacting relation with said frictional blocks when the brake bands are applied, substantially as described.

7. A brake band comprising an outer annular member and a corresponding inner member, frictional blocks loosely carried on said inner member; resilient elements bearing against the same, beveled bosses carried on said outer member, adapted to engage the outer faces of the brake blocks when the brakes are applied.

8. In a structure of the character set forth, the combination with a plurality of brake blocks, of a contracting band surrounding the same and slidable longitudinally with respect thereto, means for contracting the band, and means carried by said band and slidably bearing upon the bracket blocks for moving said brake blocks inwardly toward each other.

9. In a structure of the character set forth, the combination with a plurality of brake blocks, of a mounting therefor that permits their longitudinal movement and also their movement inwardly substantially toward a common center, and means for moving said blocks inwardly and permitting their longitudinal movements.

10. In a structure of the character set forth, the combination with a plurality of brake blocks, of a mounting therefor that permits their longitudinal movement and also their movement inwardly substantially toward a common center, means for yieldingly resisting said longitudinal movements, and means for moving the blocks inwardly and permitting their said longitudinal movement against the said resisting means.

In testimony whereof I affix my signature in the presence of two witnesses.

HERBERT B. COHO.

Witnesses:
F. V. BURGER,
W. SIEGLE.